Oct. 21, 1924.  
H. D. MORTON  
1,512,788  
ELECTRIC ARC WELDING APPARATUS AND METHOD OF OPERATING THE SAME  
Filed Feb. 5, 1924  4 Sheets-Sheet 1
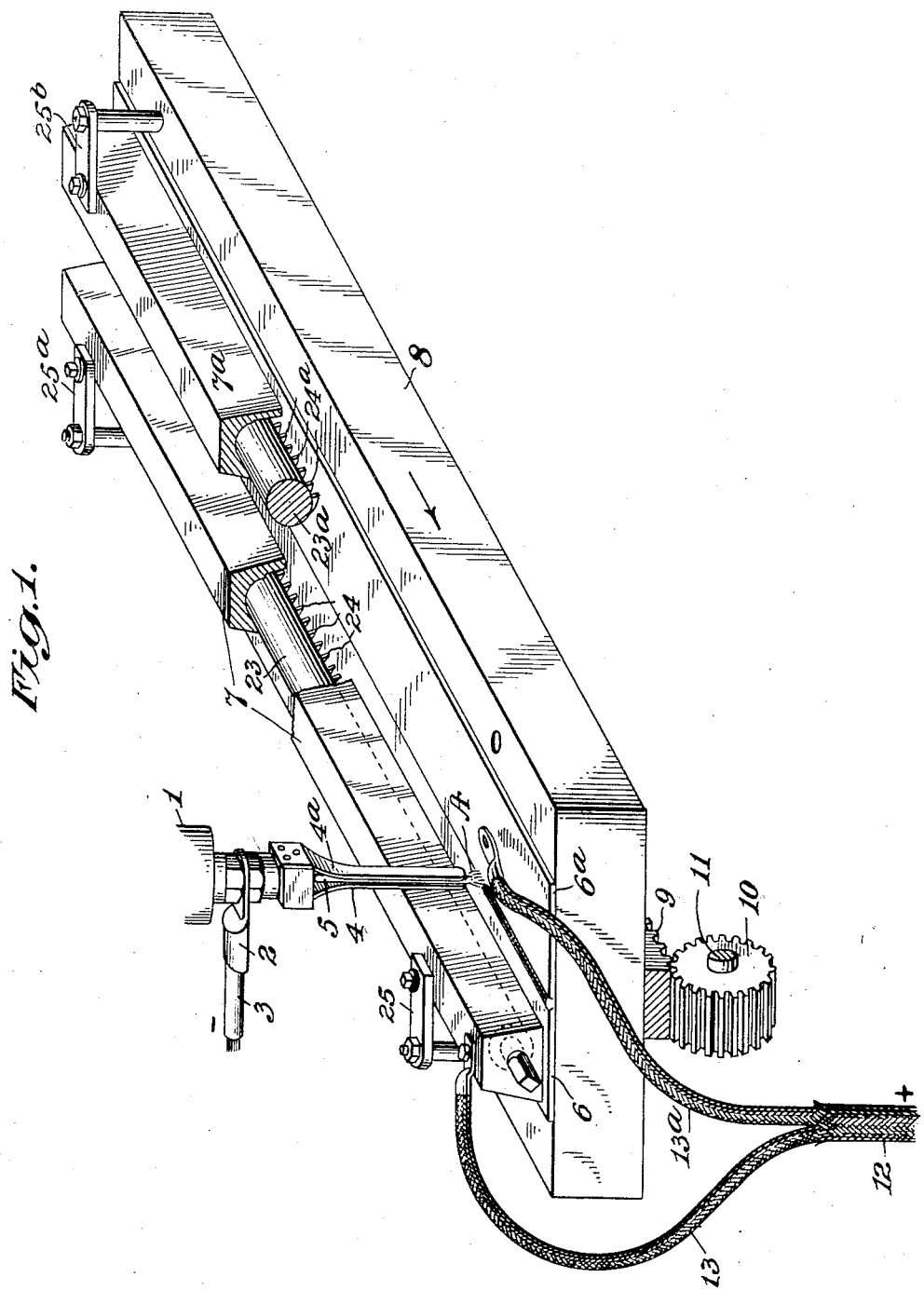
INVENTOR  
Harry D. Morton  
BY  
Gifford & Scull  
ATTORNEYS Oct. 21, 1924.  1,512,788
H. D. MORTON
ELECTRIC ARC WELDING APPARATUS AND METHOD OF OPERATING THE SAME
Filed Feb. 5, 1924  4 Sheets-Sheet 2
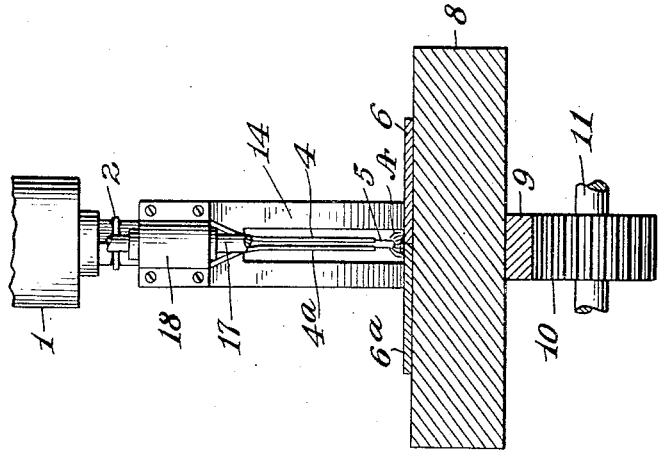
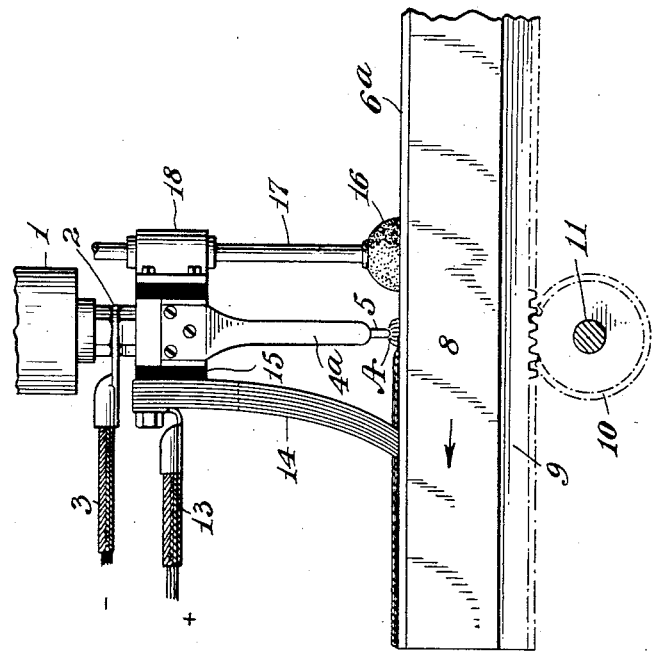
INVENTOR
Harry D. Morton
BY
Gifford & Scull
ATTORNEYS

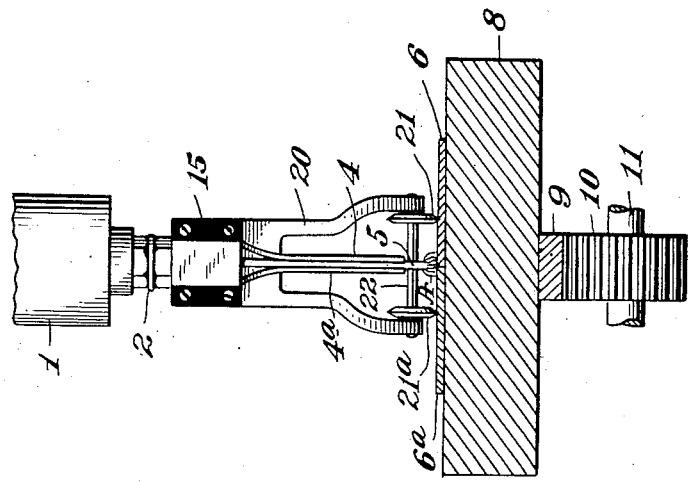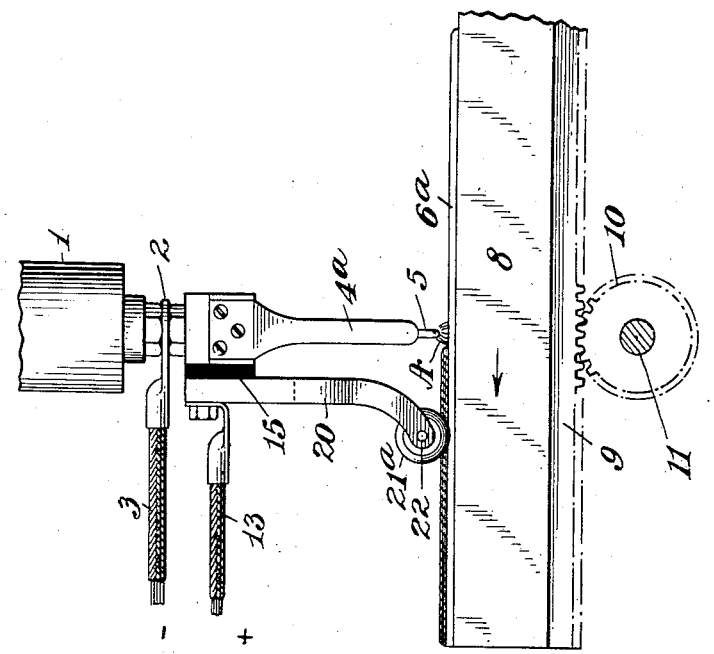

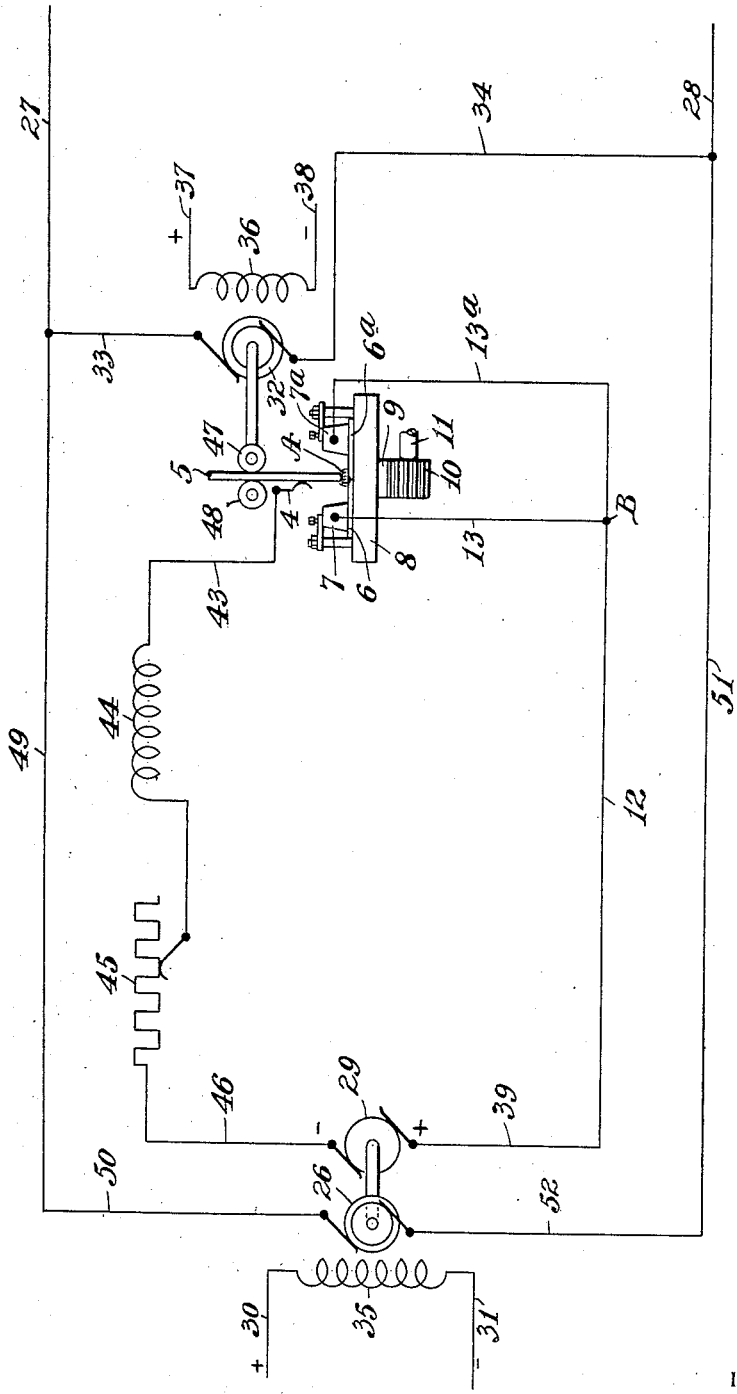

Patented Oct. 21, 1924.

1,512,788

UNITED STATES PATENT OFFICE.

HARRY D. MORTON, OF NEW YORK, N. Y.

ELECTRIC-ARC-WELDING APPARATUS AND METHOD OF OPERATING THE SAME.

Application filed February 5, 1924. Serial No. 690,703.

*To all whom it may concern:*

Be it known that I, HARRY D. MORTON, a citizen of the United States, residing in the city of New York, county of New York, and State of New York, have invented certain new and useful Improvements in Electric-Arc-Welding Apparatus and Methods of Operating the Same, of which the following is a specification.

The following is a description of an electric arc welding apparatus and the method of operating the same embodying my invention in the form and manner at present preferred by me; but it will be understood that various modifications and changes may be made without departing from the spirit of my invention and without exceeding the scope of my claims.

My invention will best be understood by reference to the accompanying drawings, in which I have illustrated the preferred forms of device for carrying out my invention, and in which Fig. 1 shows in perspective partially in section one form of the device; Fig. 2 is a side elevation and Fig. 3 a front elevation showing one modification of my invention; Fig. 4 is a side elevation and Fig. 5 a front elevation showing another modification of my invention; Fig. 6 is a wiring diagram showing one welding system which may be employed in conjunction with my invention. Like reference characters indicate like parts throughout the drawings.

Referring to the drawings, Fig. 1 shows one form of my invention wherein the two metal sheets 6 and $6^a$ are supported upon a table 8, being held in position by conductors 7 and $7^a$, to which conductors pressure is applied by clamps 25, $25^a$ and $25^b$. Welding current is conveyed from one pole of a source of electrical energy by cable 12 to cables 13 and $13^a$, to conductors 7 and $7^a$ respectively. Current is conveyed from the arc to welding pencil 5, electrode guide $4-4^a$, to lug 2 attached to the lower portion of the welding head 1, and by cable 3 to the other pole of the source of electrical energy. Associated with this welding head is a motor or other driving means for feeding the welding pencil 5 toward the work as it is consumed by the arc A, adapted to be struck between the work $6-6^a$ and the lower end of the welding pencil 5, to which current is conveyed by the contact members 4 and $4^a$. Simultaneously with the downward feeding of the welding pencil 5, the work $6-6^a$ is moved under the arc. This traversing movement may be effected by power applied to the shaft 11 of the pinion 10, meshing with the rack 9 at the bottom of the table 8. In this manner the abutting edges of the metal sheets 6 and $6^a$ are fused and a continuous weld is effected. If the electrode 5 is a metallic welding strip, the molten metal of said strip is deposited upon the work, where it coalesces with the molten metal of the work material to form a continuous weld. It is to be understood that alternatively the work may be stationary, and that the welding pencil feeding means may be movable with reference to the work, in a manner well known to those skilled in the art. Rotatably mounted in the conductors 7 and $7^a$ respectively are the round shafts 23 and $23^a$, provided with a plurality of projecting cutting edges or scarifying points, 24 and $24^a$, spaced substantially equidistant from each other. Rotation of the shafts 23 and $23^a$ brings these cutting edges or scarifying points into contact with the metal sheets 6 and $6^a$, respectively, thereby removing the surface scale from said sheets at a plurality of points, and permitting welding current to be conveyed through the conductors $7-7^a$ and through these cutting edges or scarifying points to the bare metal thus exposed. The action of these cutting edges or scarifying points is not only to remove or perforate the surface scale, but also to slightly imbed themselves in the work material. It will be understood that the shafts 23 and $23^a$ may be arranged to move lengthwise instead of rotatably in the conductors 7 and $7^a$, and the cutting edges will, in like manner, perforate or remove the surface scale and imbed themselves in the bare metal thereby exposed.

In Figs. 2 and 3 I show another form of my invention wherein an abrasive wheel 16.

mounted on the shaft 17, supported in bearing 18, and power-driven by means (not shown) applied to said shaft 17, removes the scale from the metal sheets 6 and 6ᵃ for some distance on both sides of the seam. These metal sheets are held in position on the table 8 by suitable clamping means, not shown. In this case, current is conveyed from one pole of the source of electrical energy through cable 13 to the brush 14, insulated at 15 from the electrode guide 4—4ᵃ. The brush 14 is bifurcated as shown in Fig. 3, and its lower ends contact with the portions of the metal sheets 6 and 6ᵃ which have been bared by the action of the abrasive wheel 16, whereby current from one pole of a source of electrical energy is simultaneously conveyed to both such metal sheets. Current is conveyed from the arc to the welding pencil 5, electrode guide 4—4ᵃ to lug 2, and by cable 3 to the other pole of the source of electrical energy.

In Figs. 4 and 5 I show another form of my invention wherein the edged wheels 21 and 21ᵃ, mounted on shaft 22, carried by yoke 20, attached to welding head 1 and insulated therefrom at 15, break through the scale on the metal sheets 6 and 6ᵃ, and also convey current to said sheets through the said yoke 20 and cable 13 leading to one pole of a source of electrical energy. The metal sheets 6 and 6ᵃ are held in position on the table 8 by suitable clamping means, not shown. I may alternatively employ for perforating the scale and conveying current to the sheets 6 and 6ᵃ, in place of edged wheels 21 and 21ᵃ, wheels having serrated perimeters, the teeth of which will act similarly to the cutting edges of the wheels shown. Current is conveyed from the arc to the welding pencil 5, electrode guide 4—4ᵃ to lug 2, and by cable 3 to the other pole of the source of electrical energy.

In conjunction with my present invention I preferably employ the welding system disclosed in my pending application Serial No. 601,475 Patent No. 1,483,612, February 12, 1924, and in my pending application Serial No. 686,537, wherein the welding strip is continuously fed at a constant rate, and the arc is maintained by correctively varying the wattage consumption at the arc. In the system described in my aforesaid applications, a synchronous motor drives the welding strip feeding means.

Referring to Fig. 6, the alternating current motor 26, which may be of the synchronous type and which drives the welding generator 29, receives current for its armature from the source 27—28, through lines 49, 50, 51 and 52. Its field 35 is energized by direct current from the source 30—31. The alternating current synchronous welding head motor 32 also receives current for its armature from the source 27—28, over the lines 33 and 34. Its field 36 is energized by direct current from the source 37—38. Welding current from generator 29 flows from the positive pole over line 39, line 12 to the point B, where it divides, one portion being conveyed by line 13 to the conductor 7, and through said conductor to the metal sheet 6; and the other portion being conveyed by line 13ᵃ to the conductor 7ᵃ, and through said conductor to the metal sheet 6ᵃ. From the metal sheets 6 and 6ᵃ the welding current flows through the arc A to the welding pencil 5 (fed by the rolls 47—48), through contact member 4, the line 43, reactance 44, adjustable stabilizing resistance 45 (preferably of the zero temperature coefficient of resistance type), line 46 to the negative pole of the welding generator 29.

In automatic electric arc welding systems, particularly where the metallic arc is employed, it is essential for the production of successful welds that the arc length be maintained substantially constant. One method of accomplishing this result is by feeding the welding pencil at such a rate as to produce the desired arc length when normal conditions of fusibility, conductivity, etc. obtain; and automatically correctively varying the rate of feeding upon the occurrence of an abnormality in said conditions. When the arc shortens, the current increases and the voltage decreases; and when the arc lengthens, the current decreases and the voltage increases. These variations in electrical characteristics may be employed to actuate devices which correctively alter the rate of welding pencil feed to prevent further changes in arc length and to restore the arc to its normal length. Such systems of arc control are disclosed in my United States Letters Patent No. 1,278,982 and No. 1,278,985, dated September 17, 1918; also in my pending applications Serial No. 186,238 and Serial No. 264,927. Another method of maintaining the arc length substantially constant is by feeding the welding pencil at a constant rate, rather than at variable rates, and interrupting tendencies toward changes in arc length by automatically varying the wattage, or power consumption, or fusing energy at the arc. In this method of control, which is described in my aforesaid pending applications Serial No. 601,475 and Serial No. 686,537, a tendency toward a shortening of the arc automatically produces an increase in the available wattage or fusing energy at the arc, whereby the welding pencil temporarily fuses faster than it is fed, thus interrupting the tendency toward shortening and preventing a departure from normal arc length. A modification of this method of control is disclosed in my United States Letters Patent No. 1,392,436, dated October 4, 1921.

Regardless of which of the two methods of control may be employed, the normal feeding rate which produces the desired arc length while conditions are normal must be correlated to the normal fusing rate. This requires that the resistance of the circuit external to the arc be maintained substantially constant. If the external resistance varies, the supply of wattage or fusing energy normally available at the arc ceases to be constant, and the normal feeding rate (which is predicated upon constancy of fusing energy normally available at the arc) is no longer correlated to the then available fusing energy at the arc, and therefore is not the correct feeding rate for the new electrical conditions. The result is that the arc is no longer of the desired length, and may become so short that the welding pencil contacts with the work, producing extinction of the arc; or it may become so long as to lead to oxidation and nitrogenization of the weld, or even to rupture of the arc.

In my United States Letters Patent No. 1,392,437, dated October 4, 1921, I have fully explained the effect upon arc stability and arc maintenance of insuring substantial constancy of the resistance of the welding circuit external to the arc, and have disclosed means for maintaining substantially constant the stabilizing grid resistance portion of said external circuit. In my pending application Serial No. 264,928 and in my aforesaid pending application Serial No. 601,475, I have disclosed means for compensating for changes in resistance in certain portions of the welding circuit external to the arc. In my pending application Serial No. 432,951 I have disclosed means for maintaining substantially constant that portion of the resistance of the circuit external to the arc represented by the end of the welding pencil between the electrical contact-member which conveys current to said pencil and the arc.

I have found that in certain classes of welding there are other portions of the external welding circuit the resistance of which is either subject to considerable variations or is highly uncertain, or both. A large number of products which might with advantage be automatically welded with the electric arc are made of what is known as annealed drawing steel. Hot rolled drawing steel has a surface scale which is of very high electrical resistance, and, from my experience, I have found that this scale is always extremely variable in its electrical resistance. In fact, I have found by actual tests that this resistance varies as much as 5,000 per cent. in different portions of a strip 15"x2". I have noted that it is very difficult, if not practically impossible, to maintain a stable metallic arc, when high amperage is employed, if it is sought to convey current to the surface of work material having these high and extremely variable coefficients of resistance. This is due to inability to maintain substantially constant the resistance between the current-conveying means and the work; and the difficulty is accentuated by the fact that the potential impressed upon a metallic arc welding circuit is in some instances as low as 20 volts. I have discovered, however, that if this scale, with its high and variable resistance, be punctured or removed at a plurality of points or in a continuous line along the work material, and the welding current be conveyed to the bare metal thus exposed, the variations in the resistance of the circuit external to the arc, due to this cause, are overcome. This desirable result may be obtained by removing the scale at a number of points along the work material before starting the arc by a scarifying device similar to that shown in Fig. 1; or by removing such scale during the progress of the welding operation by such devices as I have shown in Figs. 2 and 3 and 4 and 5, respectively. For reasons which will hereinafter appear, it is advisable that the scale be removed from the metal sheets respectively at substantially equal distances from the seam to be welded, and that the divided current be similarly conveyed to said metal sheets. In this manner the resistance between the arc and the point or points of application of the current to the work is maintained substantially constant.

Because of the better quality of welds produced, and for the reason that greater welding speeds are obtainable, it is desirable to use, even in the welding of thin metal sheets, a relatively high amperage. I have successfully employed 150 amperes in the welding of steel sheets $\frac{1}{16}''$ in thickness, the work, under these conditions, being backed by a chill for dissipating the surplus heat. I have found that the cross-sectional area of these thin metal products is frequently so small relative to the large amount of current passing therethrough that the amount of current delivered to the arc changes considerably because of the heating of the work material due to its high internal resistance. Where the current-conveying cable is attached to one end of a piece of thin metal of some length, there is a marked variation in the resistance, and, therefore, in the arc length, as between the start and the finish of the weld. In fact, I have observed that under these conditions the arc progressively shortens as the distance between it and the point of application of the welding current increases, and that this shortening frequently continues until the welding pencil actually contacts with the work and the arc is thus extinguished before the weld is completed. When, however, the current is conveyed to the work at a considerable number of points, the variations in resistance between the arc and the respective points of application to the work of the welding current are so reduced as to produce no noticeable effect upon the arc length.

In Figs. 2 and 3 and 4 and 5, respectively, I show means for continuously removing or cutting through the scale during the welding process, and for conveying welding current to the thereby exposed portions of the metal sheets. In these latter two cases the current is conveyed to the work at an infinite number of points on both sides of the seam, and always at a substantially constant distance from the arc. The cross-sectional area of the portions of the metal sheets between the arc and the point of application of the welding current is therefore always substantially constant, and hence the resistance of this portion of the welding circuit is substantially uniform. Whether the current is conveyed to the metal sheets by devices entering at a plurality of fixed points, as shown in Fig. 1, or along continuous scarified surfaces as shown in Figs. 2 and 3 and 4 and 5, respectively, I prefer to apply it to the metal sheets as closely as possible to the seam to be welded, because the consequent reduction of distance between the arc and the point or points of application of the welding current minimizes the heating effect due to the internal resistance of the work materials.

I have found that when automatically welding thin sheets of metal with the metallic arc, it becomes very difficult to keep the arc in alignment with the seam, if the current is conveyed to but one of the metal sheets, or to both such sheets merely by contact between the conductor and the surface of one of the sheets—particularly if there is a scale on such surface. The arc, under these conditions, plays upon the sheet in contact with the conductor, or the one having the better contact with the conductor, rather than upon the seam between the two sheets, with the result that the edge of the sheet not in contact with the conductor, or having the poorer contact with the conductor, is not sufficiently fused to effect a weld; and the molten metal from the welding pencil is deposited upon the sheet which is favored by the arc. I ascribe this action to unequal distribution to the sheets of the welding current, and to the fact that the current favors the path of least resistance. When, however, the current is conveyed to the bare metal of both sheets at a substantially constant distance from the arc, the difficulty is overcome and it is only necessary, in order to maintain the arc in alignment, to initially properly position the welding pencil feeding means, and then either move the work past the arc, or traverse the arc over the work, in the line of the seam.

I wish to be understood that with my present invention I may initially strike the arc between the welding pencil and the work by means of a device similar to that disclosed in my pending application Serial No. 686,437, or by other means well known to those skilled in the art.

My invention overcomes the difficulties heretofore encountered in automatically maintaining, stabilizing and keeping in alignment with the seam to be welded an arc employing a high amperage and used for the welding of thin metal sheets—particularly those having surfaces of high and variable resistance.

What I claim as new and desire to secure by Letters Patent of the United States is:

1. In electric arc welding wherein the work constitutes one electrode and a welding pencil constitutes the other electrode, the improvement which consists in removing scale from the work and distributing current to the bare work on both sides of the seam to be welded.

2. In electric arc welding wherein a welding pencil constitutes one electrode and the work constitutes the other electrode, the improvement which consists in removing scale from the work and conveying current to the bare work and at a plurality of separated spots.

3. In electric arc welding wherein an arc is struck between the work constituting one electrode and a welding pencil constituting the other electrode, the improvement in that method of maintaining the arc which consists in removing surface scale from the work during the welding operation and conveying current to the work at said exposed portion.

4. The method of electric arc welding which consists in striking an arc between the work constituting one electrode and a welding pencil constituting the other electrode, feeding the welding pencil toward the work, removing scale from the work and stabilizing the resistance of the circuit external to the arc by conveying current to the bare work at a substantially constant distance from the arc throughout the welding operation.

5. In electric arc welding wherein the work constitutes one electrode and a welding pencil constitutes the other electrode, the improvement in that method of stabilizing an arc struck between said electrodes which consists in removing scale from the work and distributing current to the thereby exposed portions of the work on both sides of the seam to be welded.

6. In electric arc welding, means for removing scale from the work to be welded, and means for conveying current to the scale free work.

7. In electric arc welding, means for removing scale from the work during the welding operation and means for conveying current to the work.

8. In electric arc welding, means for scarifying the surface of the work, and means for conveying current to the scarified surface of the work.

9. In electric arc welding, means for scarifying the work and means for conveying current to the scarified surface of the work at a constant distance from the arc.

10. In electric arc welding, means for scarifying the work and means for conveying current to the scarified surface of the work on both sides of the seam to be welded.

HARRY D. MORTON.